United States Patent Office 3,658,869
Patented Apr. 25, 1972

---

3,658,869
PROCESS FOR PREPARING SULFUR CONTAINING ALDOXIMES
Samuel B. Soloway, Modesto, Calif., and Herbert P. Rosinger, Kent, England, assignors to Shell Oil Company, New York, N.Y.
No Drawing. Continuation-in-part of application Ser. No. 645,511, June 12, 1967. This application Aug. 25, 1969, Ser. No. 852,899
Claims priority, application Great Britain, June 13, 1966, 26,258/66
Int. Cl. C07c *131/00*
U.S. Cl. 260—453 R
9 Claims

ABSTRACT OF THE DISCLOSURE

Process for preparing 1-hydrocarbylthio-aldoximes in an aqueous reaction medium by the halogenation of an aldoxime followed by reaction with a mercaptan in the presence of a base, said 1-hydrocarbylthio-aldoximes are known compounds which are useful as oil additives, antioxidants, accelerators for curing rubber, and as chemical intermediates.

---

This application is a continuation-in-part of Ser. No. 645,511, filed June 12, 1967, now abandoned.

FIELD OF THE INVENTION

The invention relates to an improved process for preparing 1-hydrocarbylthio-aldoximes.

DESCRIPTION OF THE PRIOR ART 1-hydrocarbylthio-aldoximes of the formula

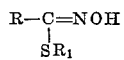

wherein R and $R_1$ are hydrocarbyl are known compounds. These compounds have been previously prepared in an organic reaction medium by the halogenation of an aldoxime followed by reaction with a mercaptan to form the 1-hydrocarbylthioaldoxime. This method is described in Can. J. Chem. 42, 2393 (1964).

The use of organic solvents for this process produces many problems, especially when commercial quantities of the 1-hydrocarbylthioaldoximes are prepared. For one thing, the separation problems of the 1-hydrocarbylthio-aldoximes are complicated by the use of organic solvents since these compounds are soluble in the organic solvents. The separation entails the use of costly distillation techniques, solvent extraction processes or the like to isolate the final product. This process is even more complicated when different organic solvents are used in the halogenation and hydrocarbylthiolation steps. In many cases, scaling-up the process results in reduced yields through extraction and decomposition losses of intermediates and final product. Additionally, the use of organic solvents increases the cost and introduces safety hazards in preparing the 1 - hydrocarbylthio-aldoximes on a commercial scale. This process, then, has not been commercially attractive.

SUMMARY OF THE INVENTION

Surprisingly, we have found that the use of an aqueous reaction medium for the preparation of 1-hydrocarbylthio-aldoximes avoids the difficulties of the prior art process. Accordingly, this invention involves a process of preparing 1-hydrocarbylthio-aldoximes in an aqueous reaction medium by reaction of a halogen with an aldoxime to form a halogenation product followed by reaction of said halogenation product with a mercaptan in the presence of a base.

The use of the aqueous reaction medium avoids the separation difficulties of organic solvent media since the 1-hydrocarbylthio-aldoximes precipitate out of the aqueous medium, being only slightly soluble in water. Furthermore, the use of water as the reaction medium obviates any need for changing solvent systems or for isolating the intermediate halogenation product. This reduction in operating steps leads to the higher yields necessary for commercial operations. The improved process of the invention has consistently produced yields of at least 80% while a similar process using organic solvents seldom produced yields of about 50%. The costs are also greatly reduced not only because of the use of water but also in the elimination of added costs connected with handling toxic, volatile organic solvents.

Since the chlorination of the aldoxime is carried out in an aqueous medium it is essential that the aldoxime reactant be at least substantially soluble in water. The crude reaction mixture from the chlorination then is reacted with the mercaptan. In this step, it is essential that the intermediate 1-haloaldoxime not be solid (i.e., that it be liquid) and it be soluble in water to at least some extent. It is then feasible to carry out the two steps of the reaction in sequence without isolating the intermediate, and without the use of organic solvents or organic extraction techniques.

The 1 - hydrocarbylthio-aldoximes prepared by the process of this invention can be described by the formula:

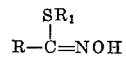

in which each R and $R_1$ is hydrocarbyl, preferably alkyl or alkenyl, of up to 5 carbon atoms each, or such radicals substituted with non-reactive functional groups.

The aldoximes and mercaptans used in the process of this invention are described by the formulae

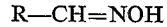

and $R_1SH$ in which R and $R_1$ are alkyl or alkenyl of up to 5 carbon atoms, or such radicals substituted with non-reactive functional groups. By non-reactive functional groups are meant those groups that do not prevent the formation of the 1-hydrocarbylthioaldoximes under the reaction conditions of this process. Functional groups that may reduce the yields of 1-hydrocarbylthio-aldoximes are, therefore, included in this definition. Suitable functional groups include halogens, i.e., fluorine, chlorine, bromine or iodine, as well as cyano, nitro, carboxyl, hydroxy and the like.

Examples of suitable R and $R_1$ radicals, which may be straight or branched-chain, include the alkyls such as methyl, ethyl, propyl, isopropyl, butyl, tert-butyl and hexane; the alkenyls such as vinyl, 2-propenyl, 3-butenyl. As previously indicated, these radicals may be suitably substituted with non-reactive functional groups such as halogen, cyano, etc.

Illustrative alkanaldoximes include acetaldoxime, propionaldoxime, n-butyraldoxime, isobutyraldoxime, n-valeraldoxime and the alkenaldoximes such as 1-vinylformaldoxime, 2-vinylacetaldoxime, 3-vinylacetaldoxime and the like.

The mercaptans (thiols) used in this invention include the alkyl mercaptans such as methyl mercaptan, ethyl mercaptan, propyl mercaptan, isopropyl mercaptan, butyl mercaptan, isobutyl mercaptan, pentyl mercaptan, hexyl mercaptan, decyl mercaptan and the like; the alkenyl mercaptans such as vinylthio, 1 - propene - 3 - thiol, 1-butene-4 - thiol, 1 - butene - 3 - thiol, 1 - pentene - 5 - thiol, 1-pentene - 3 - thiol, 1 - hexene - 5 - thiol, 1-hexene-6-thiol, 1-decene-10-thiol, 1-decene - 5 - thiol and the like; the aromatic mercaptans, i.e., those in which the $R_1$ groups contain aromatic substituents, such as benzenethiol, 1- naphthalenethiol, p - methylbenzenethiol, p-ethylbenzenethiol, benzylthiol, phenethylthiol and the like.

The base employed, which may be organic or inorganic, should be of sufficient basicity to neutralize the halogen halide produced by the halogenation and form a salt of the mercaptan.

Suitable organic bases include the aliphatic, aromatic or heterocyclic amines such as methylamine, butylamine, diethylamine, dipropylamine, triethylamine, tripropylamine, benzylamine, β-phenylethylamine, aniline, o-toluidine, pyridine, piperidine and the like.

The inorganic bases include the alkali and alkaline earth metal carbonates such as lithium, sodium and potassium carbonate, calcium carbonate and the like; the alkali metal carbonates and hydroxides such as sodium bicarbonate, potassium bicarbonate, lithium hydroxide, sodium hydroxide, potassium hydroxide and the like and other bases such as ammonia.

The halogenation of the aldoxime is conveniently performed by passing the solid, liquid or gaseous halogen, i.e., chlorine, bromine or iodine, into an aqueous reaction medium containing the aldoxime.

The temperatures employed are determined mainly by the reaction rate and yield of the intermediate halogenation produce desired. The yields tend to decrease at the lower end of the temperature range (the freezing point of the aqueous medium sets the ultimate lowest temperature that can be used) and at the upper end. In general, however, the temperature may range from about —30° C. to 75° C. Better results are obtained in the range of about —20° C. to 50° C., with temperatures of —10° C. to 30° C. being particularly suitable. Best results are obtained when the temperature is maintained between about —5° C., and 5° C. Internal and/or external cooling may be employed to maintain the temperature in a suitable range during the exothermic reaction.

The halogenation is generally quite rapid, i.e., reaction times of about 5 minutes to several hours being generally sufficient, while usually the reaction is complete in less than an hour.

The quantity of halogen employed is not critical and is generally the same as prescribed for the prior art reactions carried out in organic solvents. The theoretical quantity necessary to form the intermediate 1-haloaldoxime

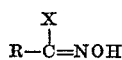

where X is halogen and R is as previously defined, is best and any errors in proportion are made on the side of a deficiency of halogen.

After the completion of the halogenation, the reaction of the halogenation product and mercaptan is carried out in the aqueous liquid phase in presence of the base without isolating the intermediate 1-haloaldoxime. The order of addition is relatively unimportant since the mercaptan may be added to the halogenation product or vice versa. In either case, however, the reaction is conducted in the presence of the base.

The base need not be added at this stage in the process. That is, the base may initially be present in the aqueous aldoxime reaction medium prior to halogenation or it may be added to the halogenation product either prior to the addition of the mercaptan or as an aqueous basic mixture in which the mercaptan is present as a salt of the base. Additionally, part of the base may be added prior to the halogenation and the remainder after the halogenation.

The aqueous reaction mixture should contain enough base to neutralize the hydrogen halide formed during the halogenation and form a salt of the mercaptan.

The temperatures employed in this stage of the process are usually in the same range as those used in the halogenation, i.e., the reaction is favored by temperatures around room temperature and below, say about 0° to 30° C. with about 0° to 15° C. being preferred. Higher or lower temperatures as with the halogenation may be employed, however.

The formation of the 1-hydrocarbylthio-aldoxime is rapid after the two aqueous reaction mixtures have been mixed. Any excess base present should usually be neutralized before recovering the 1-hydrocarbylthio-aldoxime since they are less soluble in a neutral or slightly acidic solution. The 1-hydrocarbylthio-aldoxime, which precipitates out of solution, can then be separated by conventional techniques such as filtration, purified by washing with cold water and dried.

While the process can be operated by batchwise procedures, it is well suited to continuous operation. A convenient mode of operation is that in which at least the halogenation step is carried out continuously by continual injection of halogen into a flowing stream of the aqueous aldoxime mixture. Preferably the injected halogen is caused to flow countercurrent to the flowing stream of aqueous aldoxime solution. This can be conveniently accomplished by injecting the halogen continuously into a vertical column from an inlet at least partway down the column while the aqueous solution of aldoxime flows downwardly through the column. The halogenation product can then be continuously mixed with an aqueous alkaline solution of the salt of the mercaptan. As previously indicated it is generally immaterial whether the base is present in the initial aqueous aldoxime mixture or added later, provided that it is present when the mercaptan addition takes place.

The aldoxime used as starting materials in the process may conveniently be prepared by reacting the appropriate aldehyde with hydroxylamine salts, optionally in the presence of an alkali metal carbonate. Another method involves reacting the aldehyde in a water medium with sodium nitrite, sodium bisulfite, and sulfur dioxide. The aldoximes produced by these techniques may be used in situ without isolation. These convenient methods of preparing the aldoximes in situ are yet another advantage of the instant integrated all-water process of producing the 1-hydrocarbylthioaldoximes, i.e., the preparation of the starting material can be effected in the same medium as used in the later process stages.

The 1-hydrocarbylthio-aldoximes are known compounds which are useful as oil additives, anti-oxidants, accelerators for curing rubber and as chemical intermediates.

DESCRIPTION OF THE PREFERRED EMBODIMENTS

Preferred aldoximes for use in this invention are those of the formula R—CH=NOH in which R is alkyl of 1–5 carbon atoms, e.g., methyl, ethyl, propyl, isopropyl, butyl, pentyl, especially alkyl of 1–3 carbons, or alkenyl of 2–5 carbon atoms, e.g., vinyl, 2-propenyl, 3-butenyl, 4-pentenyl.

The preferred mercaptans for use in this invention are those of the formula $R_1SH$ in which $R_1$ is alkyl or alkenyl as defined for R above, haloalkyl of 1–5 carbon atoms, e.g., mono-haloalkyl such as chloromethyl, 2-chloroethyl, 2-bromo-n-propyl, 3-chlorobutyl, 5-chloropentyl and polyhaloalkyl such as dichloromethyl, 2,2-dibromoethyl, 3,3,3-trichloro-n-propyl, 4,5-dichloro-n-pentyl; or cyanoalkyl of 1–5 carbon atoms such as cyanomethyl, 2-cyanoethyl, 3-cyano-n-propyl, 4-cyano-n-pentyl and the like.

The most preferred aldoximes and mercaptans for use in this invention are those of the above formula in which R and $R_1$ are alkyl of 1–3 carbon atoms or allyl.

Because of their greater water solubility and the ease of salt formation with the mercaptans, the alkali metal hydroxides and bicarbonates, e.g., sodium hydroxide, potassium hydroxide, lithium hydroxide, sodium bicarbonate, potassium bicarbonate, especially sodium hydroxide, are the preferred bases. In order that the base can neutralize the hydrogen halide formed during the halogenation and form a salt of the mercaptan, it is preferred that at least two equivalents of the base are employed for each equivalent of halogen or aldoxime starting material used.

One of the preferred methods of incorporating the alkali metal hydroxide or bicarbonate is to perform the halogenation in an aqueous solution containing two equivalents of alkali metal carbonate and one equivalent of aldoxime followed by the addition of the mercaptan. Another preferred method is to add an aqueous solution prepared by dissolving one equivalent of mercaptan in two equivalents of alkali metal hydroxide to the halogenation product. A third preferred mode is to neutralize the halogenation reaction mixture with the alkali metal hydroxide or bicarbonate and add to this mixture an aqueous solution of an alkali metal mercaptide.

The process according to the present invention is further illustrated in the following examples in which parts by weight (w.) and parts by volume (v.) bear the same relation as the kilogram to the liter.

EXAMPLE I

Preparation of 1-methylthio-acetaldoxime

Chlorine (142 w.) was introduced over a period of 15 minutes into a solution of acetaldoxime (118 w.) in ice water (500 v.) at a pH of 5–6. The reaction mixture was then added over a period of 10 minutes at −10° C. to 0° C. to an aqueous solution of sodium methyl mercaptide, prepared by adding methyl mercaptan (100 w.) to sodium hydroxide (60 w.) in water (1000 v.) at 0° C. to 10° C. A colorless precipitate formed. The solution was adjusted to pH 6–7 with a few drops of hydrochloric acid. The product was filtered, washed with a little ice-water and dried. 1-methylthio-acetaldoxime was obtained as a colorless crystalline product. Yield: 195 w., 92.9%, M.P. 94–95° C.

Analysis.—$C_3H_7NOS$ requires (percent): C, 34.3; H, 6.7; N, 13.3; S, 30.5. Found (percent): C, 34.4; H, 6.8; N, 13.3; S, 30.4.

EXAMPLE II

In situ formation of the aldoxime

Hydroxylamine hydrochloride (139 w.) was dissolved in water (300 v.), cooled to 0° C. and neutralized with sodium hydroxide (80 w.) in distilled water (200 v.). Acetaldehyde (88 w.) was added dropwise to this solution with cooling. After stirring for one hour at 0° C., concentrated hydrochloric acid (68 v.) was added and chlorine (142 w.) was introduced at 5° C. to 10° C. over a period of 20 minutes. The reaction mixture was then added over a period of 10 minutes at −10° C. to 0° C. to an aqueous solution of sodium methyl mercaptide prepared by adding methyl mercaptan (130 w.) to sodium hydroxide (184 w.) in water (1000 v.) at 0° C. to 10° C. A colorless crystalline product separated. The solution was adjusted to pH 6–7 with two drops of concentrated hydrochloric acid. The product was filtered off, washed with a little ice-water and dried. 1-methylthio-acetaldoxime was obtained as colorless crystals. Yield 100 w. (47.6%) M.P. 94–95° C.

EXAMPLE III

Acetaldoxime (118 w.) was dissolved in 5% w./v. hydrochloric acid (400 v.). Chlorine (142 w.) was bubbled in rapidly at a temperature of between 5° C. and 10° C. Sodium bicarbonate (195 w.) was added to the reaction mixture. The reaction mixture was then added to an aqueous solution of sodium methyl mercaptide prepared by adding methyl mercaptan (139 w.) to sodium hydroxide (185 w.) in ice-cold water (1000 v.) at 0° C. to 10° C. A colorless precipitate formed. The solution was adjusted to pH 6–7 with a few drops of concentrated hydrochloric acid. The product was filtered off, washed with a little ice-water and dried. 1-methylthiocetaldoxime (154 w.) (73.3%) was obtained, M.P. 94–95° C.

EXAMPLE IV

Acetaldoxime (750 w.) was dissolved in water (3000 v.) and the solution was cooled by means of a $CO_2$/IPA batch at −40° C. Chlorine gas (900 w.) was rapidly introduced into the solution with vigorous stirring, while the internal temperature was maintained at approximately 8° C. The chlorine addition took forty-five minutes. The blue aqueous solution changed to a greenish color when excess chlorine was present. This solution was then added over a period of fifteen minutes to an aqueous solution of sodium methyl mercaptide, prepared by the addition of methyl mercaptan (625 w.) to a solution of sodium hydroxide (1040 w.) in water (3000 v.) at −10° C. The temperature was kept between 0–15° C. during this reaction. 1-methylthio-acetaldoxime separated from the aqueous phase as a white crystalline solid which was filtered off, washed with a little ice-cold water, and dissolved in methylene chloride.

The aqueous phase was extracted with methylene chloride (3×1000 v.) to remove the last traces of product. The extracts were combined with the main bulk, both dried over sodium sulfate, and the solvent was evaporated to give 1-methylthio-acetaldoxime as a white crystalline solid (1009 w., yield 75.5%), M.P. 94–95° C.

EXAMPLE V

Continuous chlorination method

An apparatus consisting of a vertical column packed with glass helices and surrounded by a cooling jacket was prepared. An aqueous solution of acetaldoxime (800 ml./mole) was pumped to the top of this column at a constant rate (0.05 mol/minute) while chlorine gas was introduced into the column at the same rate (0.05 mol/minute) by means of a side arm halfway up the column.

During the introduction of the reactants the column was cooled by circulating isopropyl alcohol at 0° C. through the cooling jacket.

The eluate from the column was arranged to flow into an aqueous solution of sodium methyl mercaptide prepared by adding methyl mercaptan (3.9 mole) to sodium hydroxide (6.9 mole) in water (1.5 liters). Chlorination was continued for 60 minutes (being the time required to pass 3.0 mole of acetaldoxime) during which time the sodium methyl mercaptide solution was maintained at 0° C.

The resulting aqueous slurry was stirred for a further hour after completion of the addition of the column eluate. Neutralization of the excess caustic soda followed by filtration yielded the first batch of product as a white crystalline solid while extraction of the filtrate with methylene chloride followed by removal of the solvent by evaporation gave a second batch.

The overall yield of 1-methylthio-acetaldoxime, M.P. 94–95° C., by this method was 90.2%.

EXAMPLE VI

Sodium bicarbonate (168 w.) was added to a solution of acetaldoxime (59 w.) dissolved in distilled water (400 v.). Chlorine gas (72 w.) was introduced over twenty-seven minutes with the temperature maintained at 0° C. This reaction was only slightly exothermic, $CO_2$ was evolved, and the solution changed to a pinkish color. When the chlorine addition was complete the clear solution was at pH 7. An axcess of methyl mercaptan was then added to the resulting solution over a period of fifteen minutes, with the temperature maintained between 0–15° C. The reaction was moderately exothermic and 1-methylthio-acetaldoxime was precipitated immediately. After stirring for one hour at room temperature, the product was filtered to give a white crystalline solid (70 w.), M.P. 94–95° C. The aqueous phase was extracted with methylene chloride to yield more product (18 w.), M.P. 85–90° C., which was contaminated with a small quantity of oily material. Total weight of material obtained was 88 g. representing a yield of 83.7%.

EXAMPLE VII

In situ formation of the aldoxime

A solution of sodium metabisulfite (95 w.) in water (450 v.) was added slowly to a solution of sodium nitrite (69 w.) in water (200 v.) while the temperature of the mixture was maintained at 0° C. After completion of the addition, sulfur dioxide (64 w.) was passed into the mixture over a period of thirty minutes while the temperature was maintained between −2 and −5° C. Acetaldehyde (44 w.) was then added and the mixture was heated at 75° C. for thirty minutes.

The mixture was cooled, neutralized with sodium carbonate solution and filtered. The filtrate was cooled to 0° C. and chlorine gas was passed into the solution until a greenish color indicated that excess chlorine was present.

This aqueous solution of chlorination product was added to a solution of sodium methyl mercaptide at 0° C. and 1-methylthio-acetaldoxime, M.P. 94–95° C., was recovered from the reaction mixture as described in the previous examples.

The process yielded 55.2% of product based on the weight of acetaldehyde used.

We claim as our invention:

1. In the process of preparing a 1-hydrocarbylthio-aldoxime of the formula

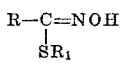

wherein R is alkyl of up to 3 carbon atoms and $R_1$ is alkyl or alkenyl of up to 3 carbon atoms in which an aldoxime of the formula R—CH=NOH is reacted with a halogen in a liquid medium to form a 1-haloaldoxime and said 1-haloaldoxime is reacted with a mercaptan of the formula $R_1SH$ in the presence of a base to form said 1-hydrocarbylthioaldoxime, the improvement comprising:

(a) conducting the reaction of the aldoxime with halogen in the presence of essentially only water as the liquid reaction medium, at a temperature within the range of from about −30° C. to about 75° C.;

(b) treating the entire resulting reaction mixture with the mercaptan and base, optionally together with additional water, at a temperature of from about −30° C. to about 75° C., to form the 1-hydrocarbyl-thioaldoxime.

2. The process of claim 1 wherein the base is an alkali metal bicarbonate or hydroxide.

3. The process of claim 2 wherein the halogen is chlorine.

4. The process of claim 3 wherein the base is present during the halogenation.

5. The process of claim 3 wherein the base and mercaptan are added together to the 1-haloaldoxime as an alkaline aqueous solution of an alkali metal mercaptide.

6. The process of claim 1 wherein the R and $R_1$ radicals are alkyl of 1–3 carbon atoms.

7. The process of claim 6 wherein both R and $R_1$ are methyl.

8. The process of claim 1 wherein the halogenation is carried out continuously by the continual injection into a continual flowing stream of aqueous aldoxime solution.

9. The process of claim 2 wherein at least two equivalents of base are present for each equivalent of aldoxime.

References Cited

UNITED STATES PATENTS 3,535,361   10/1970   Anders et al. _____ 260—453

OTHER REFERENCES

Benn, Canadian J. Chem., vol. 42, pp. 2393–97 (1964).
Chemical Abstracts, vol. 52, col. 18299(h) (1958).

LEON ZITVER, Primary Examiner

G. A. SCHWARTZ, Assistant Examiner

U.S. Cl. X.R.
260—566 A